(12) United States Patent
Tone

(10) Patent No.: US 12,547,260 B2
(45) Date of Patent: Feb. 10, 2026

(54) CONTROL METHOD FOR DISPLAY SYSTEM, CONTROL METHOD FOR DISPLAY DEVICE, AND CONTROL METHOD FOR CONTROL DEVICE

(71) Applicant: SEIKO EPSON CORPORATION, Tokyo (JP)

(72) Inventor: Takehiko Tone, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/904,298

(22) Filed: Oct. 2, 2024

(65) Prior Publication Data

US 2025/0110589 A1 Apr. 3, 2025

(30) Foreign Application Priority Data

Oct. 3, 2023 (JP) ................................. 2023-172065

(51) Int. Cl.
*G06F 3/038* (2013.01)
*H04N 7/08* (2006.01)
*H04N 9/31* (2006.01)

(52) U.S. Cl.
CPC ............. *G06F 3/0383* (2013.01); *H04N 7/08* (2013.01); *H04N 9/31* (2013.01)

(58) Field of Classification Search
CPC ........ G06F 3/14; G06F 3/0425; G06F 3/1446; G06F 3/0481; G06F 3/0383; G09G 2354/00; G09G 5/14; G09G 3/002; H04N 21/4316; H04N 21/47; H04N 21/4858; H04N 5/45; H04N 9/3147; H04N 7/08
See application file for complete search history.

(56) References Cited

U.S. PATENT DOCUMENTS

| | | | |
|---|---|---|---|
| 9,172,891 B2 * | 10/2015 | Ueda | G09G 5/14 |
| 2013/0106908 A1 * | 5/2013 | Ichieda | G06F 3/0425 |
| | | | 345/629 |
| 2016/0018905 A1 | 1/2016 | Nagao | |

FOREIGN PATENT DOCUMENTS

| | | |
|---|---|---|
| JP | 2013-97177 A | 5/2013 |
| JP | 2016-21699 A | 2/2016 |

* cited by examiner

*Primary Examiner* — Koosha Sharifi-Tafreshi
(74) *Attorney, Agent, or Firm* — Oliff PLC

(57) ABSTRACT

A control method for a display system includes: causing a control device to generate a first display image in which a captured image acquired by a projector and an APP image are arranged; causing the projector to display the first display image; causing the control device to perform processing on the first display image, based on operation information representing an operation to the first display image, and thus generate a second display image; and causing the projector to display the second display image.

6 Claims, 10 Drawing Sheets

CONTROL METHOD FOR DISPLAY SYSTEM, CONTROL METHOD FOR DISPLAY DEVICE, AND CONTROL METHOD FOR CONTROL DEVICE

The present application is based on, and claims priority from JP Application Serial Number 2023-172065, filed Oct. 3, 2023, the disclosure of which is hereby incorporated by reference herein in its entirety.

BACKGROUND

1. Technical Field

The present disclosure relates to a control method for a display system, a control method for a display device, and a control method for a control device.

2. Related Art

According to the related art, a device that displays a plurality of images on a display surface and executes processing on the plurality of images which are displayed, based on an operation to the display surface, is known.

For example, JP-A-2013-97177 discloses a display device including a display, a position detector, and a processor. The display displays input images supplied from a plurality of image sources, in a plurality of display areas on a display surface. The position detector detects an indicated position on the display surface. The processor executes processing over the plurality of display areas, based on the detected indicated position.

JP-A-2013-97177 is an example of the related art.

There may be a case where the plurality of image sources should be made to execute processing, based on an operation to the display surface. However, not all of the plurality of image sources may necessarily be able to execute this processing and therefore the images inputted from the plurality of image sources may not be able to reflect the processing.

SUMMARY

According to an aspect of the present disclosure, a control method for a display system includes: causing a display device to acquire a first image; causing a control device to generate a first display image in which the first image acquired by the display image and a second image are arranged; causing the display device to display the first display image; causing the control device to perform processing on the first display image, based on operation information representing an operation to the first display image, and thus generate a second display image; and causing the display device to display the second display image.

According to another aspect of the present disclosure, a control method for a display device includes: acquiring a first image and transmitting the acquired first image to a control device; receiving, from the control device, a first display image in which the first image and a second image are arranged; displaying the first display image; receiving, from the control device, a second display image generated by processing on the first display image, based on operation information representing an operation to the first display image; and displaying the second display image.

According to still another aspect of the present disclosure, a control method for a control device includes: generating a first display image in which a first image received from a display device and a second image are arranged; transmitting the first display image to the display device; processing the first display image, based on operation information representing an operation to the first display image, and thus generating a second display image; and transmitting the second display image to the display device.

DESCRIPTION OF EMBODIMENTS

Embodiments of the present disclosure will now be described with reference to the drawings.

1. System Configuration According to Embodiment

Figure 1:
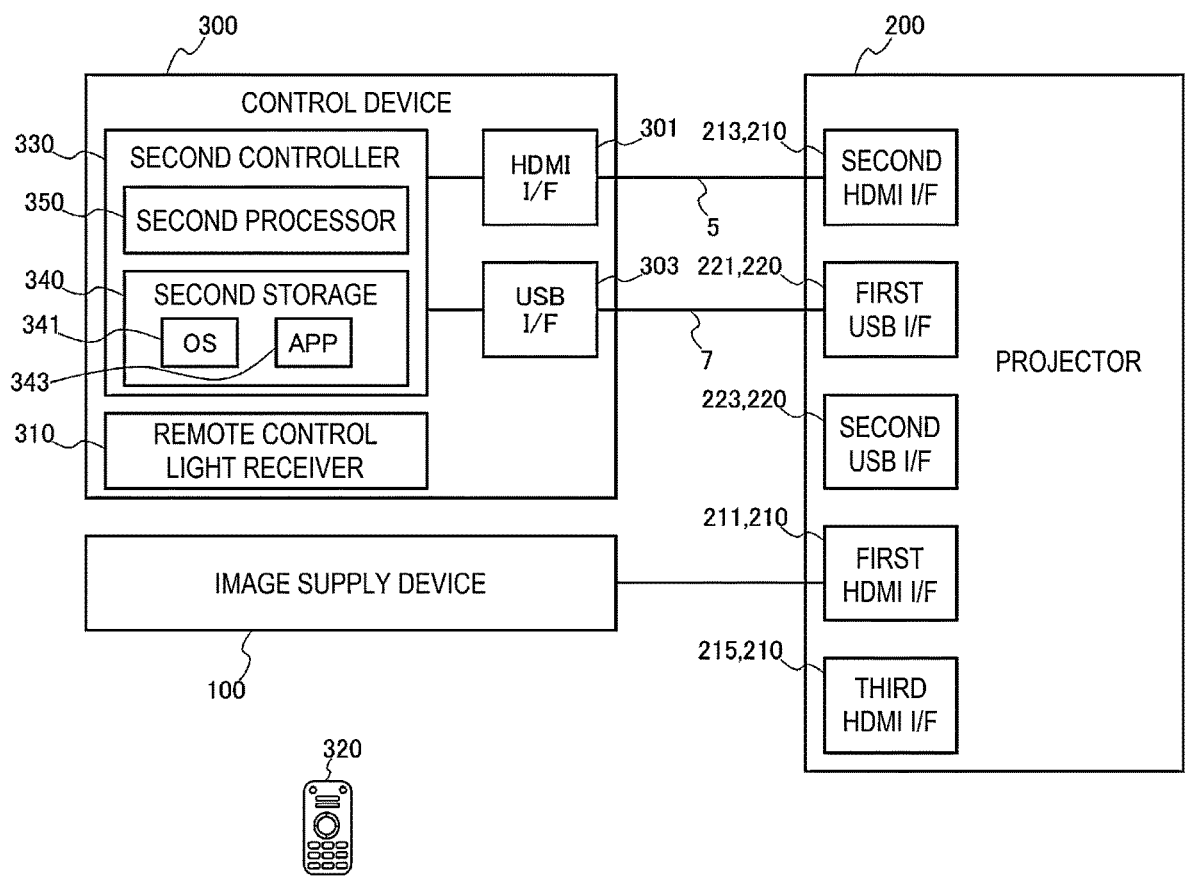
FIG. 1 shows the system configuration of a display system.

FIG. 1 shows the system configuration of a display system 1.

The display system 1 has an image supply device 100, a projector 200, and a control device 300. The projector 200 is an example of a display device.

While FIG. 1 shows a configuration where one image supply device 100 is coupled to the projector 200, the number of image supply devices 100 coupled to the projector 200 is not limited to one, and two or more image supply devices 100 may be coupled.

The image supply device 100 is a device that supplies image data to the projector 200. As the image supply device 100, for example, a laptop or desktop personal computer, or a smart device such as a smartphone, a smart stick or a tablet terminal can be used. As the image supply device 100, a recorder such as a digital versatile disc (DVD), a Blu-ray disc (BD) or a hard disk drive (HDD), or various set top boxes (STBs) may be used.

The projector 200 is a device that displays an image on a projection surface 30. The projector 200 also detects an operation to the projection surface 30 performed using a pointer 50. The projector 200 transmits operation information representing the detected operation to the control device 300.

The projector 200 has a plurality of image interfaces used to communicate image data, and a plurality of data interfaces used to communicate image data and control data. Hereinafter, an interface is also referred to as an I/F. In this embodiment, a case where the projector 200 has HDMI I/Fs 210 as the image I/Fs and USB I/Fs 220 as the data I/Fs is described. The image I/F of the projector 200 may be, for example, a display port, and the data I/F of the projector 200 may be, for example, Ethernet. HDMI and Ethernet are registered trademarks. Hereinafter, the image I/Fs and the data I/Fs may be collectively referred to as input I/Fs.

FIG. 1 shows a case where the projector 200 has a first HDMI I/F 211, a second HDMI I/F 213, and a third HDMI I/F 215, as the HDMI I/Fs 210.

FIG. 1 also shows a case where the projector 200 has a first USB I/F 221 and a second USB I/F 223, as the USB I/Fs 220.

In this embodiment, a case where the image supply device 100 is coupled to the first HDMI I/F 211 and where the control device 300 is coupled to the second HDMI I/F 213 is described. Also, in this embodiment, a case where the control device 300 is coupled to the first USB I/F 221 is described.

As the control device 300, a smart device such as a smartphone, a smart stick or a tablet terminal can be used.

The control device 300 generates a display image 500 to be displayed by the projector 200. The display image 500 includes an image based on image data supplied from the image supply device 100 to the projector 200 or an image generated by an application program executed by the control device 300. The display image 500 includes a first display image 500A shown in FIGS. 4 and 6 and a second display image 500B shown in FIG. 5.

Operation information is inputted to the control device 300 from the projector 200. The control device 300 generates an object image to be superimposed on the display image 500, based on the operation information inputted from the projector 200. The control device 300 superimposes the object image on the display image. The control device 300 transmits the display image 500 with the object image superimposed thereon to the projector 200.

In this embodiment, an HDMI I/F 301 is coupled to the second HDMI I/F 213 of the projector 200 via a cable 5, and a USB I/F 303 is coupled to the first USB I/F 221 of the projector 200 via a cable 7. The first USB I/F 221 is equivalent to a first interface.

When coupling the USB I/F 303 of the control device 300 and the first USB I/F 221 of the projector 200 via the cable 7, the control device 300 causes the projector 200 to be recognized as a USB video class device. Thus, the projector 200 transmits a captured image 635, described later, in a format prescribed by USB video class. The captured image 635 is equivalent to a first image.

When the HDMI I/F 301 has a male connector and the second HDMI I/F 213 has a female connector, the male connector of the HDMI I/F 301 may be directly coupled to the female connector of the second HDMI I/F 213.

2. Configuration of Projector

Figure 2:
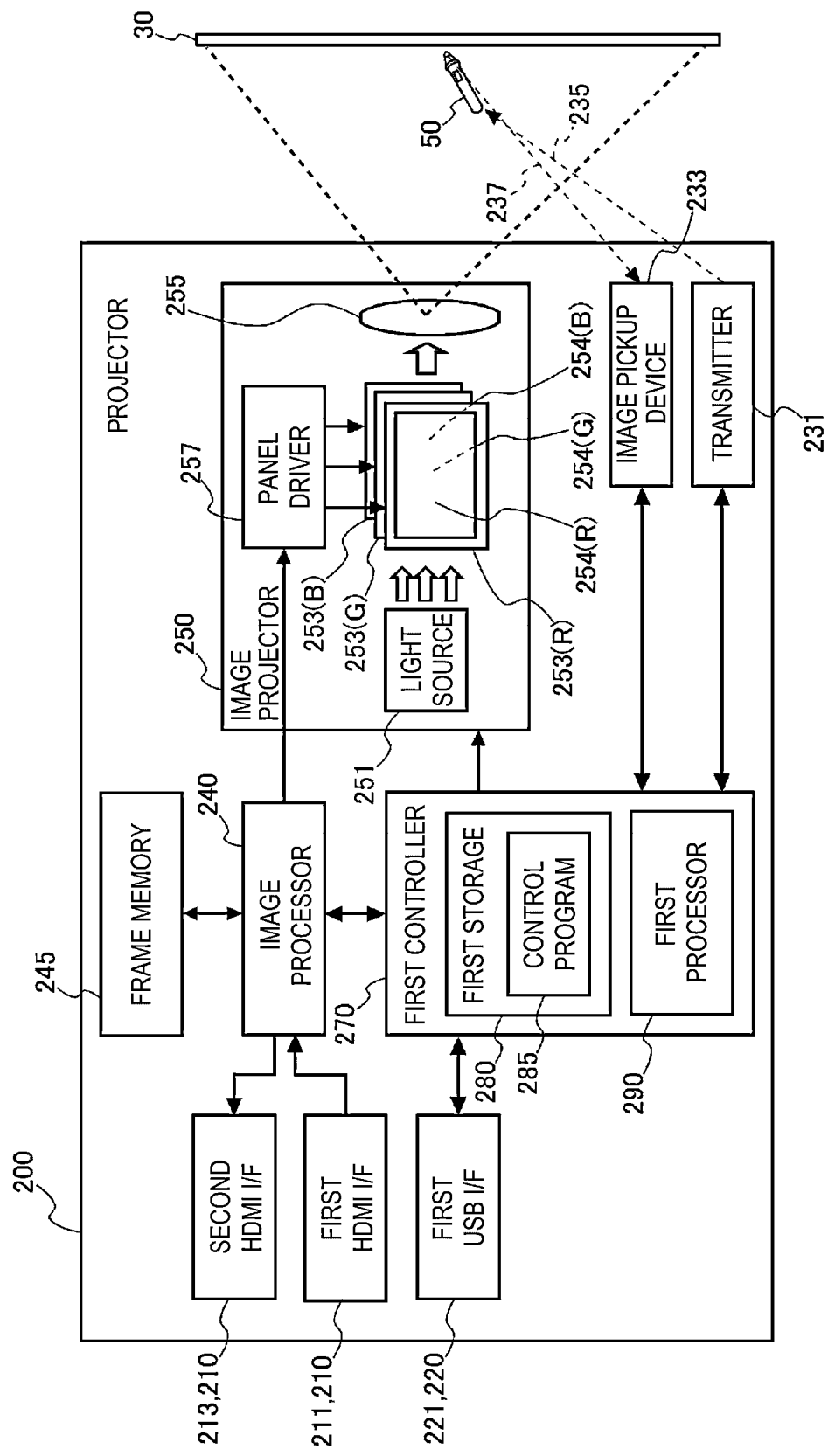
FIG. 2 is a block diagram showing the configuration of a projector.

FIG. 2 is a block diagram showing the configuration of the projector 200.

The configuration of the projector 200 will now be described with reference to FIG. 2.

To simplify the illustration, FIG. 2 shows the first HDMI I/F 211 and the second HDMI I/F 213 as the image I/Fs and shows only the first USB I/F 221 as the data I/F.

The projector 200 has the HDMI I/F 210, the USB I/F 220, a transmitter 231, an image pickup device 233, an image processor 240, a frame memory 245, an image projector 250, and a first controller 270.

The HDMI I/F 210 has a connection port and an interface circuit conforming to the HDMI standard.

The USB I/F 220 has a connection port and an interface circuit conforming to the USB standard.

The transmitter 231 has, for example, a light source such as a light-emitting diode (LED), and a device that controls the turning on and off of the light source. The device that controls the turning on and off can be formed of, for example, an application-specific integrated circuit (ASIC), a field-programmable gate array (FPGA) or the like.

The transmitter 231 outputs a first signal light 235, which is a signal to synchronize the timing of light emission of the pointer 50 with the timing of image pickup of the image pickup device 233. The first signal light 235 is a near-infrared light signal that can be received by the pointer 50. The transmitter 231 periodically transmits the first signal light 235 of near-infrared light while the projector 200 is in operation.

The first signal light 235 is a control signal indicating the timing of causing the pointer 50 to transmit a second signal light 237. The pointer 50 has a light source such as an LED and a device that controls the tuning on and off of the light source, and emits the second signal light 237 in a preset light emission pattern, based on the timing of receiving the first signal light 235 as a reference point. The projector 200 causes the image pickup device 233 to execute image pickup at the timing when the pointer 50 emits the second signal light 237.

The pointer 50 has a switch at the tip of the pointer 50. This switch is on in the state where the tip is in contact with the projection surface 30 and off in the state where the tip is spaced apart from the projection surface 30. The pointer 50 emits the second signal light 237 in different light emission patterns between the state where the switch is on and the state where the switch is off.

The image pickup device 233 is a camera having an image pickup element, not illustrated, such as a charge-coupled device (CCD) sensor or a complementary metal-oxide semiconductor (CMOS) sensor. The image pickup device 233 has an infrared transmission filter absorbing visible light and transmitting infrared light, and picks up infrared light emitted from the pointer 50 via this infrared transmission filter. The image pickup device 233 picks up an image of the projection surface 30 at a preset timing of image pickup, based on the timing of light emission when the transmitter 231 emits the first signal light 235, as a reference point. The image pickup device 233 successively outputs the picked-up image to the first controller 270.

The first controller 270 analyzes the picked-up image inputted from the image pickup device 233 and detects the light emission of the second signal light 237.

The pointer 50 transmits the second signal light 237 in different light emission patterns between when the switch is on and when the switch is off, based on the timing of receiving the first signal light 235 as a reference point. Therefore, the first controller 270 analyzes a plurality of successive picked-up images and thus determines whether the detected light emission of the second signal light 237 is the light emission when the pointer 50 is in contact with the projection surface 30 or the light emission when the pointer 50 is not in contact with the projection surface 30.

In the first controller 270, a first storage 280 stores calibration data. The calibration data is data to convert the position of light emission of the second signal light 237 in the picked-up image to a position on the projection surface 30. Based on the calibration data, the first controller 270 converts the position of light emission of the second signal light 237 detected from the picked-up image to an indicated position on the projection surface 30.

The frame memory 245 is coupled to the image processor 240. The image processor 240 loads an image based on the image data inputted from the second HDMI I/F 213, into the frame memory 245. The image processor 240 performs image processing such as resolution conversion or resizing, correction of distortion aberration, shape correction, digital zoom, and adjustment of the color tone and luminance of the image, on the image loaded in the frame memory 245. The image processor 240 outputs image information, which is information of the image loaded in the frame memory 245, to a panel driver 257 of the image projector 250.

The frame memory 245 and the image processor 240 are configured with, for example, an integrated circuit. The integrated circuit includes a large-scale integrated circuit (LSI), an ASIC, a programmable logic device (PLD), a field-programmable gate array (FPGA), a system-on-a-chip (SoC) or the like. The frame memory 245 and the image processor 240 may include an analog circuit in a part of the configuration of the integrated circuit or may be configured with a combination of the first controller 270 and an integrated circuit.

The image projector 250 has a light source 251, a light modulation device, and the panel driver 257. The light modulation device has three liquid crystal panels 253(R), 253(G), 253(B), and a projection lens 255, which is an optical system unit.

The light source 251 includes a solid-state light source such as a light emitting diode or a semiconductor laser. A discharge-type light source lamp such as an ultra-high-pressure mercury lamp or a metal halide lamp may be used for the light source 251. The light source 251 emits light that is the source of image light under the control of the first controller 270. The light emitted from the light source 251 is converted to light with substantially uniform luminance distribution by an optical integration system, not illustrated, and is separated into color light components of the three primary colors of light, that is, red (R), green (G), and blue (B), by a color separation optical system, not illustrated. Subsequently, the lights separated into the color light components of red (R), green (G), and blue (B) enter the liquid crystal panels 253(R), 253(G), 253(B), respectively. The lights separated into the color light components entering the liquid crystal panels 253(R), 253(G), 253(B) are referred to color lights.

Each of the liquid crystal panels 253(R), 253(G), 253(B) is configured with a transmission-type liquid crystal panel formed of a pair of transparent substrates and a liquid crystal enclosed between the transparent substrates, or the like. In the liquid crystal panels 253(R), 253(G), 253(B), rectangular image forming areas 254(R), 254(G), 254(B) formed of a plurality of pixels arranged in the form of a matrix are formed, respectively, and a drive voltage can be applied thereto at each pixel.

The panel driver 257 forms an image in the image forming areas 254(R), 254(G), 254(B) in the liquid crystal panels 253(R), 253(G), 253(B). Specifically, the panel driver 257 applies a drive voltage corresponding to the image information inputted from the image processor 240, to each pixel in the image forming areas 254(R), 254(G), 254(B) according to an instruction from the first controller 270. Thus, each pixel in the image forming areas 254(R), 254(G), 254(B) is set to the light transmittance corresponding to the image information. The light emitted from the light source 251 is transmitted through the image forming areas 254(R), 254(G), 254(B) in the liquid crystal panels 253(R), 253(G), 253(B) and thus modulated at each pixel, and an image light corresponding to the image information is formed corresponding to each color light. The image lights of the individual colors, thus formed, are combined together at each pixel to form an image light representing a color image by a light combining system, not illustrated, and the image light is projected in an enlarged form on the projection surface 30 by the projection lens 255.

The first controller 270 has the first storage 280 and a first processor 290.

The first storage 280 has at least a nonvolatile storage device. The first storage 280 may be configured to have a volatile storage device as well. The nonvolatile storage device is formed of, for example, a read-only memory (ROM), a flash memory, an electrically erasable programmable read-only memory (EEPROM) or the like.

The first storage 280 is used as a computation area of the first processor 290. The first storage 280 stores a control program 285 executed by the first processor 290, and setting data that represent settings about operations of the projector 200, or the like.

The first processor 290 is a computational processing device having a processor such as a central processing unit (CPU) or a micro-processing unit (MPU). The first processor 290 may be formed of a single processor or a plurality of processors. The first processor 290 may be formed of a SoC integrated with a part or the entirety of the first storage 280 or with another circuit. The first processor 290 may be formed of a combination of a CPU executing a program and a digital signal processor (DSP) executing predetermined computational processing. Also, all of the functions of the first processor 290 may be installed in hardware or may be configured using a programmable device.

3. Configuration of Control Device

Referring back to FIG. 1, the configuration of the control device 300 will be described.

The control device 300 has the HDMI I/F 301, the USB I/F 303, a remote control light receiver 310, and a second controller 330.

The HDMI I/F 301 has a connection port and an interface circuit conforming to the HDMI standard. The HDMI I/F 301 is equivalent to a second interface.

The USB I/F 303 has a connection port and an interface circuit conforming to the USB standard.

A remote controller 320 has, for example, a screen division button, a d-pad corresponding to each of up, down, left, and right directions, an undo button to undo an accepted input, enlarge and reduce buttons, and an enter button to finalize an accepted input, or the like. The screen division button is a button to cause the projector 200 to display the display image 500 having a plurality of screens.

While an example where the dedicated remote controller 320 to operate the control device 300 is provided is described in this embodiment, the remote controller 320 may be a portable terminal such as a smartphone. In this case, an application program installed in the portable terminal displays an operation key or the like on the touch panel of the portable terminal.

The second controller 330 has a second storage 340 and a second processor 350.

The second storage 340 has, for example, at least a nonvolatile storage device such as a ROM, a flash memory, or an EEPROM. The second storage 340 may have a volatile storage device such as a random-access memory (RAM) in addition to the nonvolatile storage device.

The second storage 340 is used as a computation area of the second processor 350. The second storage 340 stores an OS and the application program 343 executed by the second processor 350. Hereinafter, the application program is referred to as an APP.

The second processor 350 is a computational processing device having a processor such as a CPU or an MPU. The second processor 350 may be formed of a single processor or a plurality of processors. The second processor 350 may be formed of a SoC integrated with a part or the entirety of the second storage 340 or with another circuit. The second processor 350 may be formed of a combination of a CPU executing a program and a DSP executing predetermined computational processing. Also, all of the functions of the second processor 350 may be installed in hardware or may be configured using a programmable device.

4. Operations of Display System

Operations of the display system 1 causing the projector 200 to display the display image 500 having a plurality of screens 600 on the projection surface 30 and performing processing on the display image 500, based on an operation performed using the pointer 50, will now be described.

In the plurality of screens 600, images supplied from the image supply device 100 or the control device 300 are displayed, respectively. In this embodiment, a case where a first screen 610 and a second screen 630 are displayed as the plurality of screens 600 is described. The images supplied from the image supply device 100 or the control device 300 include, for example, a moving image or a still image played back by the image supply device 100 or the control device 300, an image generated by executing an application program installed in the image supply device 100 or the control device 300, or the like. Hereinafter, the application program is referred to as the APP 343. Also, the image generated by executing the application program is referred to as an APP image.

Figure 3:
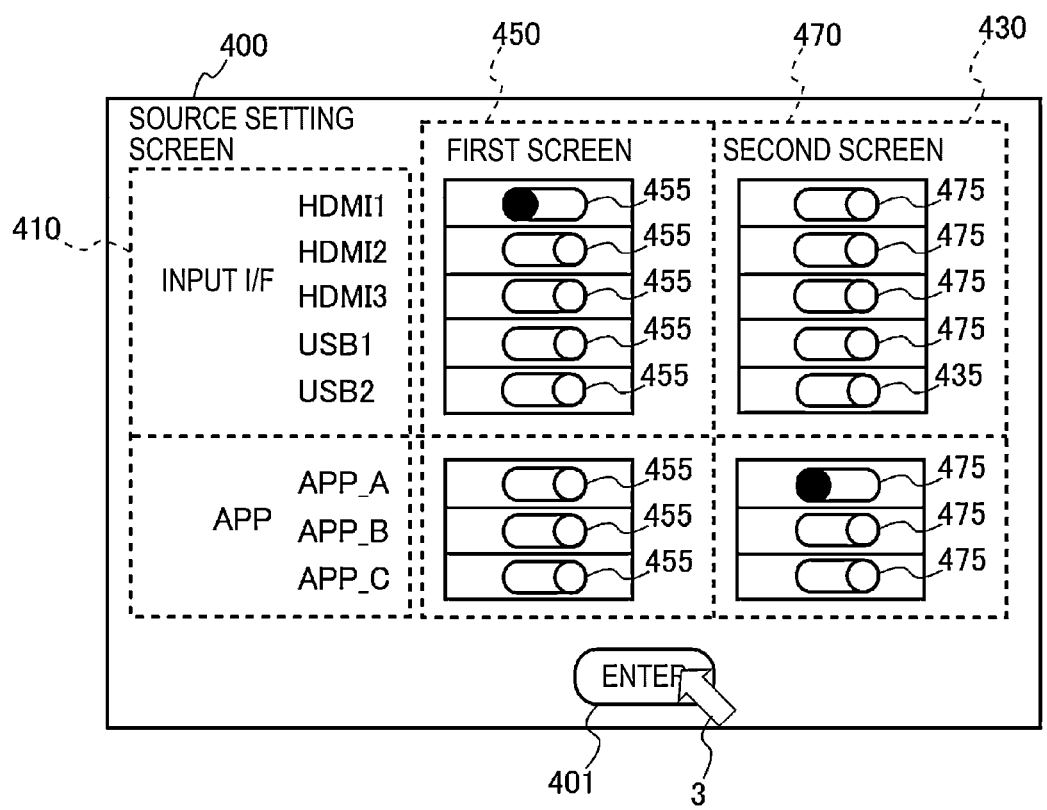
FIG. 3 shows a source setting screen.

FIG. 3 shows a source setting screen 400.

When causing the projector 200 to display a plurality of screens, the user presses the screen division button provided on the remote controller 320.

When an operation signal indicating that the screen division button is pressed is inputted from the remote control light receiver 310, the second controller 330 causes the projector 200 to display the source setting screen 400, which is a screen to set a source. The second controller 330 transmits image data of the source setting screen 400 to the projector 200. The projector 200 generates an image light based on the received image data and projects the generated image light onto the projection surface 30. Thus, the source setting screen 400 is displayed on the projection surface 30.

The source setting screen 400 includes an enter button 401, a cursor 3, a source list 410, and a setting field 430.

The enter button 401 is a button to finalize a setting accepted on the source setting screen 400. The display position of the cursor 3 on the source setting screen 400 is changed by an operation of the d-pad on the remote controller 320.

The source list 410 shows a list of sources. The source list 410 shows the input I/F provided in the projector 200 and the APP installed in the control device 300, as sources.

The setting field 430 is a field to set a source to be displayed by the projector 200, of a plurality of sources shown in the source list 410. The setting field 430 includes a first screen setting field 450 and a second screen setting field 470. In the description below, a case where the projector 200 is made to display two screens, that is, the first screen 610 and the second screen 630, is described. In the first screen setting field 450, a toggle button 455 is displayed for each source shown in the source list 410, and in the second screen setting field 470, a toggle button 475 is displayed for each source shown in the source list 410.

The user operates the d-pad on the remote controller 320 to move the cursor 3 to the position of the toggle button 455 corresponding to the source to be displayed in the first screen 610 and then presses the enter button on the remote controller 320. Thus, the selected toggle button 455 is changed from off to on.

Similarly, the user operates the d-pad on the remote controller 320 to move the cursor 3 to the position of the toggle button 475 corresponding to the source to be displayed in the second screen 630 and then presses the enter button on the remote controller 320. Thus, the selected toggle button 475 is changed from off to on.

Subsequently, the user operates the d-pad on the remote controller 320 to move the cursor 3 to the position of the enter button 401. The user then presses the enter button provided on the remote controller 320. As an operation signal indicating that the enter button is pressed is inputted from the remote control light receiver 310, the second controller 330 accepts the setting configured on the source setting screen 400.

Subsequently, the second controller 330 transmits a processing request indicating processing to be executed by the projector 200. This processing request includes a first processing request and a second processing request.

The first processing request includes a transmission request for operation information indicating the position on the projection surface 30 indicated by the pointer 50. When the source set on the source setting screen 400 does not include the input I/F of the projector 200, the second controller 330 transmits the first processing request to the projector 200. That is, the image to be displayed by the projector 200 is only an APP image 615 generated by executing the APP installed in the control device 300 and does not include the image inputted to the input I/F. Therefore, the second controller 330 transmits the first processing request that requests the transmission of the operation information, to the projector 200.

The second processing request includes a transmission request for the captured image 635 and identification information indicating the input I/F to capture the image, in addition to the transmission request for the operation information included in the first processing request. When the source set on the source setting screen 400 includes the input I/F of the projector 200, the second controller 330 transmits the second processing request to the projector 200. The second processing request includes the identification information of the input I/F set on the source setting screen 400, and the transmission request for the captured image 635 formed by capturing the image inputted to the input I/F indicated by this identification information, in addition to the transmission request for the operation information.

When receiving the first processing request from the control device 300, the first controller 270 causes the transmitter 231 to start transmitting the first signal light 235. The first controller 270 also causes the image pickup device 233 to execute image pickup and generate a picked-up image, based on the timing of transmission of the first signal light 235.

The first controller 270 detects the light emission of the second signal light 237 from the picked-up image generated by the image pickup device 233. The first controller 270 generates operation information indicating the position indicated by the pointer 50, based on the detected position of light emission of the second signal light 237. The first controller 270 transmits the generated operation information to the control device 300.

Meanwhile, when receiving the second processing request from the control device 300, the first controller 270 causes the image processor 240 to load the image data inputted to the input I/F indicated by the identification information, into the frame memory 245. The first controller 270 also causes the image processor 240 to capture the image based on the image data loaded in the frame memory 245 and generate the captured image 635. The first controller 270 transmits the generated captured image 635 to the control device 300 via the first USB I/F 221.

As in the case of receiving the first processing request, the first controller 270 generates operation information indicating the position indicated by the pointer 50 and transmits the generated operation information to the control device 300.

Figure 4:
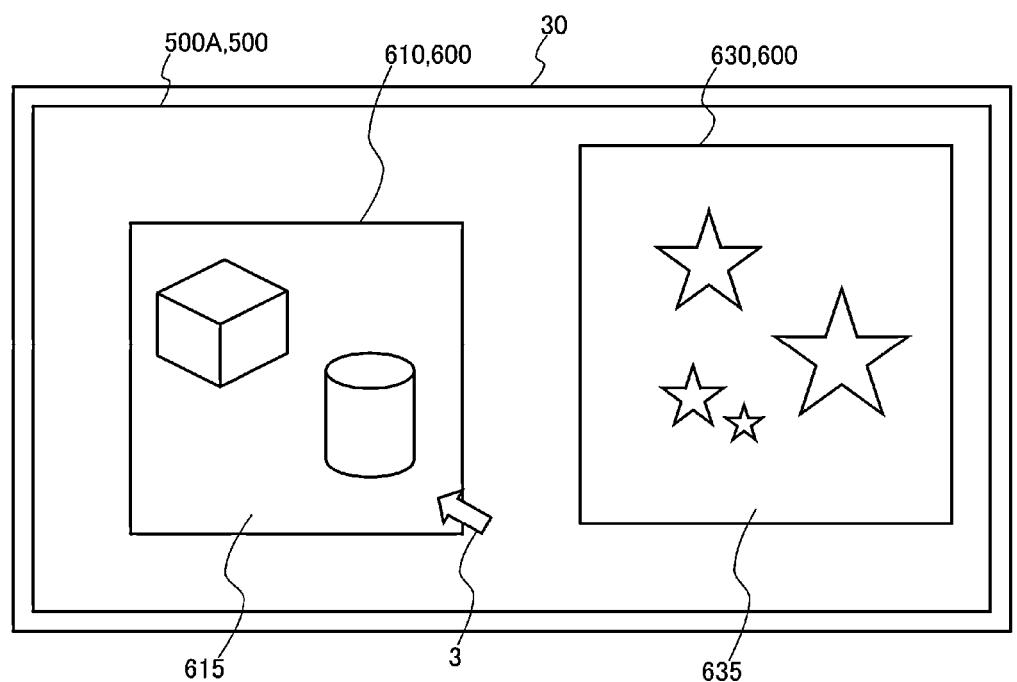
FIG. 4 shows a first display image.

FIG. 4 shows the first display image 500A displayed on the projection surface 30.

Subsequently, the second controller 330 generates the first display image 500A to be displayed by the projector 200. The first display image 500A includes the first screen 610 and the second screen 630.

When the source set on the source setting screen 400 includes the APP installed in the control device 300, the second controller 330 starts the APP set on the source setting screen 400. The second controller 330 executes the set APP and causes the APP image 615 generated by the APP to be displayed in the first screen 610 or the second screen 630. In the description below, it is assumed that the APP image 615 generated by the APP is displayed in the first screen 610. The APP image 615 is equivalent to a second image.

When the source set on the source setting screen 400 includes the input I/F of the projector 200, the second controller 330 receives the captured image 635 transmitted from the projector 200. The second controller 330 causes the received captured image 635 to be displayed in the first screen 610 or the second screen 630. In the description below, it is assumed that the captured image 635 is displayed in the second screen 630.

Figure 5:
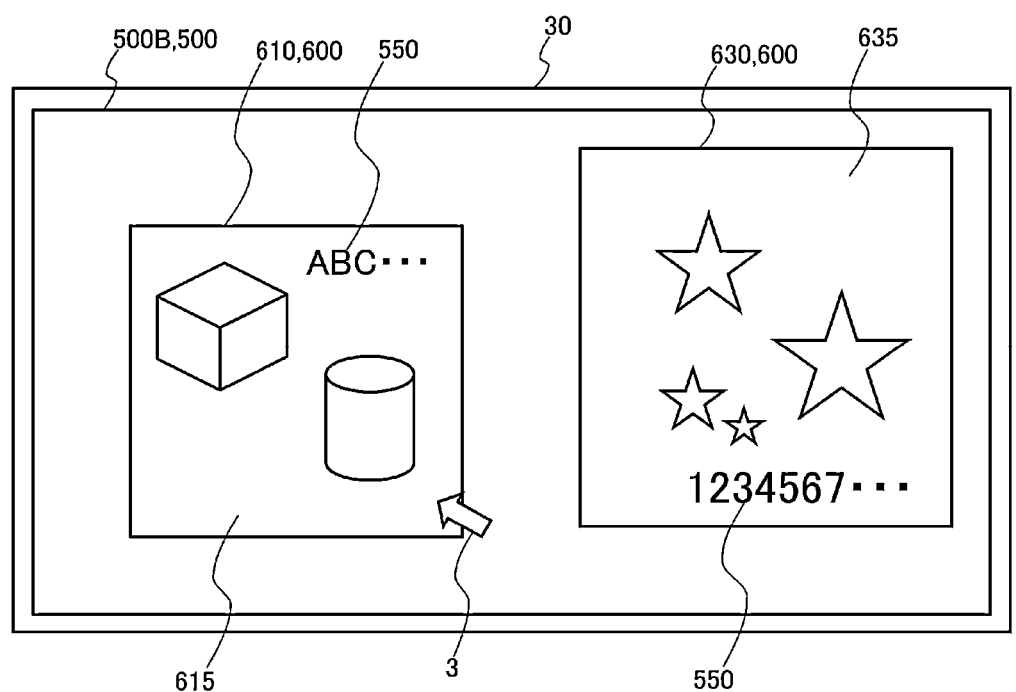
FIG. 5 shows a second display image.

FIG. 5 shows the second display image 500B.

When receiving the operation information from the projector 200, the second controller 330 generates an object image 550, based on the received operation information, and superimposes the generated object image 550 at the position in the first display image 500A indicated by the operation information. The image formed of the first display image 500A with the object image 550 superimposed thereon is referred to as the second display image 500B. The second display image 500B, too, is an example of the display image 500.

When the operation information received from the projector 200 includes the operation information indicating the indicated position on the projection surface 30, the second controller 330 superimposed the object image 550 at the position on the projection surface 30 indicated by the operation information. The object image 550 generated in this case is, for example, an image showing a line corresponding to the trajectory of the indicated position shown on the projection surface 30. When the operation represented by the operation information is an operation to change the width of the line or the color of the line, the second controller 330 changes the thickness or color of the line displayed as the object image 550. When an eraser icon is selected as an icon, the object image 550 displayed at the position on the projection surface 30 indicated by the operation information is erased. The processing of superimposing the object image 550, the processing of changing the thickness or color of the line displayed as the object image 550, or the processing of erasing the object image 550 is an example of processing on the first display image.

The operation information may also be information indicating a change in the display color, luminance or the like of the first APP image 615 or the captured image 635 displayed in the first display image 500A or the second display image 500B. In this case, the second controller 330 may control the first APP image 615 and thus change the display color or luminance of the first APP image 615 or may superimpose the image indicated by the operation information on the captured image 635 and thus change the display color of the captured image 635.

After generating the second display image 500B, the second controller 330 transmits image data of the generated second display image 500B to the projector 200. The projector 200 generates an image light based on the image data received from the control device 300 and causes the projection lens 255 to display the generated image light on the projection surface 30. Thus, the second display image 500B generated by the control device 300 is displayed on the projection surface 30.

Figure 6:
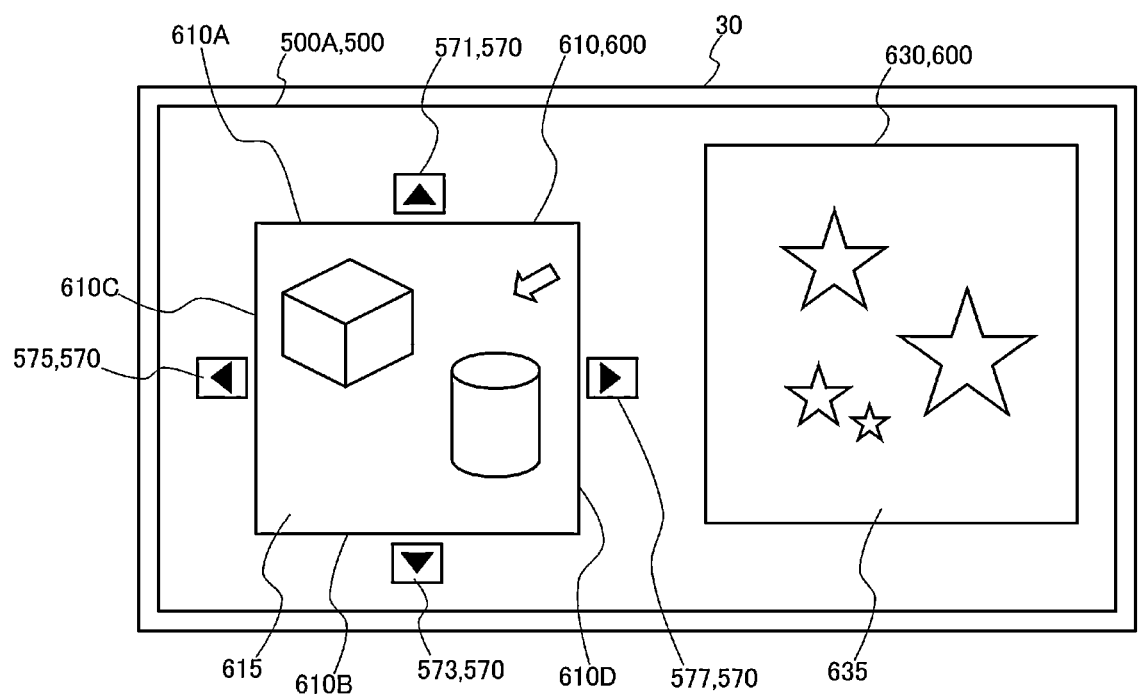
FIG. 6 shows an operation to change the display position of a first screen.

FIG. 6 shows an operation to change the display position of the first screen 610.

The user can operate the remote controller 320 to change the display position or the display size of the first screen 610 and the second screen 630 in the first display image 500A. This operation will now be described.

First, the user operates the d-pad on the remote controller 320 to move the cursor 3 onto the first screen 610 or the second screen 630 whose display position or display size is to be changed. Subsequently, the user makes a short press on the enter button on the remote controller 320. It is now assumed that the first screen 610 is selected.

When an operation signal indicating that a short press on the enter button is made is inputted, the second controller 330 causes arrow images 570 indicating up, down, left, and right directions shown in FIG. 6 to be displayed at a top side 610A, a bottom side 610B, a left side 610C, and a right side 610D of the first screen 610, respectively. At the top side 610A of the first screen 610, an arrow image 571 indicating the up direction is displayed. At the bottom side 610B of the first screen 610, an arrow image 573 indicating the down direction is displayed. At the left side 610C of the first screen 610, an arrow image 575 indicating the left direction is displayed. At the right side 610D of the first screen 610, an arrow image 577 indicating the right direction is displayed.

The user operates the d-pad on the remote controller 320 to move the cursor 3 to the display position of the arrow image 570 corresponding to the direction in which the first screen 610 is to be moved. The user then presses the enter button on the remote controller 320. When an operation signal indicating that the enter button is pressed is inputted from the remote control light receiver 310, the second controller 330 moves the first screen 610 by a preset distance in the direction corresponding to the arrow image 570 overlapping the display position of the cursor 3. The second controller 330 moves the first screen 610 by a preset distance every time the enter button is pressed.

After moving the first screen 610 to the position in the first display image 500A where the first screen 610 is to be displayed, the user presses the enter button provided on the remote controller 320. As the enter button on the remote controller 320 is pressed, the second controller 330 finalizes the display position of the first screen 610.

Also, when enlarging or reducing the display size of the screen 600, the user operates the d-pad on the remote controller 320 to place the cursor 3 over the screen 600 whose display position or display size is to be changed, and then presses the enter button. When changing the display size of the screen 600, the user may press the enter button twice consecutively or may hold the enter button down. In this embodiment, it is assumed that when the user performs an operation of holding the enter button down, the second controller 330 is enabled to accept an operation of the enlarge button or the reduce button provided on the remote controller 320. In this state, the user presses the enlarge button or the reduce button provided on the remote controller 320. While the enlarge button or the reduce button is pressed, the second controller 330 enlarges or reduces the display size of the screen 600 over which the cursor 3 is placed.

As the adjustment of the display position or the display size of the screen 600 in the first display image 500A is finished, the user moves the cursor 3 to a position that does not overlap the screen 600, and then presses the enter button on the remote controller 320.

As the enter button on the remote controller 320 is pressed in the state where the cursor 3 does not overlap the screen 600, the second controller 330 determines that the adjustment of the display position or the display size of the screen 600 is finished. The second controller 330 transmits the image data of the first display image 500A or the second display image 500B to the projector 200 via the HDMI I/F 301.

The first controller 270 of the projector 200 causes the image processor 240 to load the received image data of the first display image 500A or the second display image 500B into the frame memory 245. The image processor 240 performs image processing such as adjustment of the color tone or luminance of the image, on the image loaded in the frame memory 245. Subsequently, the image processor 240 outputs image information, which is information of the image loaded in the frame memory 245, to the image projector 250. The image projector 250 generates an image light corresponding to the image information and causes the projection lens 255 to project the generated image light onto the projection surface 30.

Figure 7:
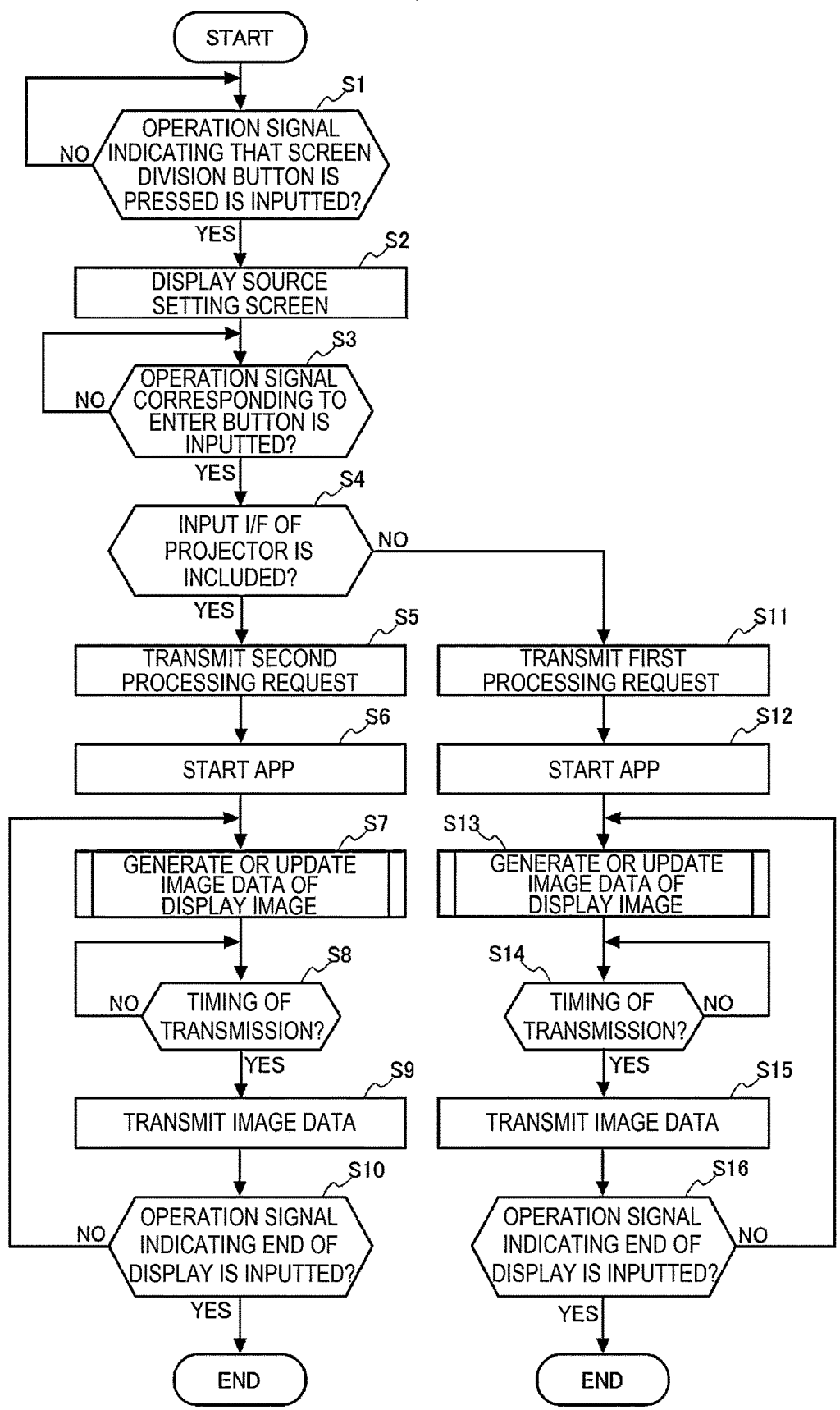
FIG. 7 is a flowchart showing operations of a control device.
Figure 8:
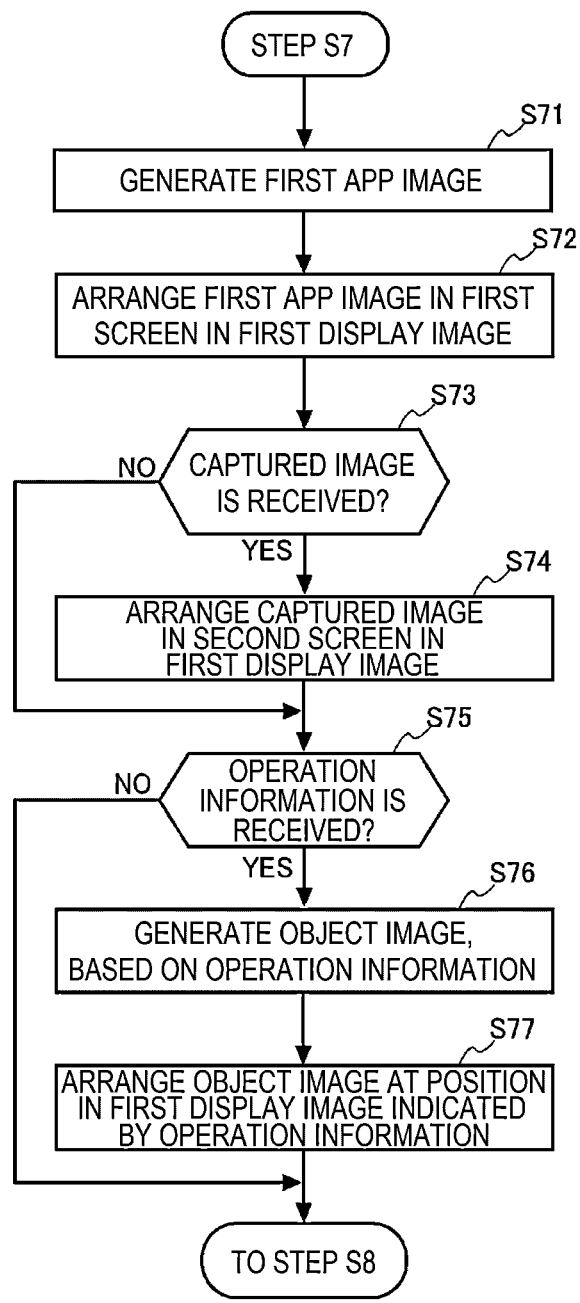
FIG. 8 is a flowchart showing operations of the control device.
Figure 9:
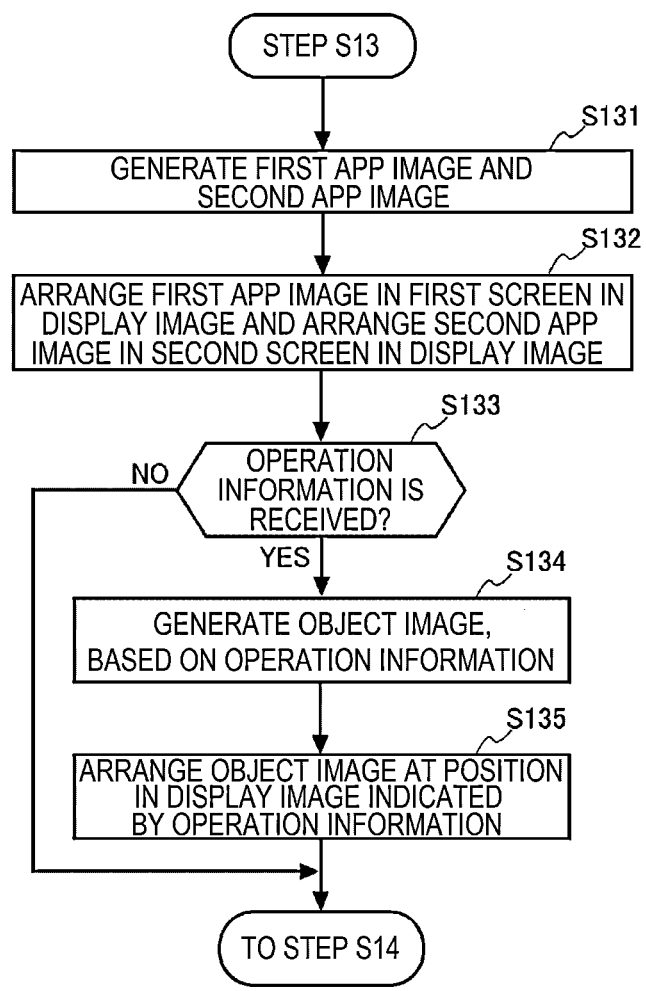
FIG. 9 is a flowchart showing operations of the control device.

FIGS. 7, 8, and 9 are flowcharts showing operations of the control device 300.

The operations of the control device 300 will now be described with reference to the flowcharts shown in FIGS. 7, 8, and 9.

First, the second controller 330 determines whether an operation signal indicating that the screen division button on the remote controller 320 is pressed is inputted from the remote control light receiver 310 (step S1). When the operation signal of the screen division button is not inputted (NO in step S1), the second controller 330 waits for the start of this processing flow.

When the operation signal indicating that the screen division button is pressed is inputted (YES in step S1), the second controller 330 causes the projector 200 to display the source setting screen 400 on the projection surface 30 (step S2). The second controller 330 generates image data of the source setting screen 400 and transmits the image data to the projector 200. The projector 200 generates an image light based on the received image data and projects the generated image light onto the projection surface 30. Thus, the source setting screen 400 is displayed on the projection surface 30.

Next, the second controller 330 accepts the setting configured on the source setting screen 400 by an operation of the remote controller 320. The second controller 330 then determines whether an operation signal indicating that the enter button on the remote controller 320 is pressed is inputted from the remote control light receiver 310 (step S3). When the operation signal indicating that the enter button is pressed is not inputted (NO in step S3), the second controller 330 waits until the enter button is pressed.

When the operation signal indicating that the enter button on the remote controller 320 is pressed is inputted (YES in step S3), the second controller 330 determines whether the source selected on the source setting screen 400 includes the input I/F of the projector 200 (step S4).

When the source includes the input I/F of the projector 200 (YES in step S4), the second controller 330 transmits the second processing request to the projector 200 (step S5). The second processing request includes a transmission request for operation information, a transmission request for the captured image 635, and identification information indicating the input I/F to capture an image.

Next, the second controller 330 starts the APP set on the source setting screen 400 (step S6). It is now assumed that the first APP is set on the source setting screen 400. The second controller 330 executes the started first APP and generates image data of the first display image 500A or the second display image 500B (step S7). Alternatively, when image data of the first display image 500A or the second display image 500B is already generated, the second controller 330 updates the image data of the first display image 500A or the second display image 500B (step S7).

Next, the second controller 330 determines whether it is a timing of transmission when the image data of the first display image 500A or the second display image 500B is transmitted to the projector 200 (step S8). When it is not the timing of transmission (NO in step S8), the second controller 330 waits until it is the timing of transmission.

When the second controller 330 determines that it is the timing of transmission of the image data of the first display image 500A or the second display image 500B (YES in step S8), the second controller 330 transmits this image data to the projector 200 (step S9).

Next, the second controller 330 determines whether an operation signal indicating the end of the display is inputted from the remote control light receiver 310 (step S10). When the operation signal indicating the end of the display is not inputted (NO in step S10), the second controller 330 returns to the processing of step S7. When the operation signal indicating the end of the display is inputted (YES in step S10), the second controller 330 ends this processing flow.

The operations of the control device 300 when it is determined in step S4 that the source does not include the input I/F of the projector 200 will now be described.

When the source does not include the input I/F of the projector 200 (NO in step S4), the second controller 330 transmits the first processing request to the projector 200 (step S11). The first processing request includes a transmission request for operation information.

Next, the second controller 330 starts the APP set on the source setting screen 400 (step S12). It is now assumed that two APPs, that is, the first APP and the second APP, are set. The second controller 330 executes the first APP and the second APP that are started, and generates image data of the first display image 500A or the second display image 500B (step S13). Alternatively, when image data of the first display image 500A or the second display image 500B is already generated, the second controller 330 updates the image data of the first display image 500A or the second display image 500B (step S13).

The operations of steps S14 to S16 following step S13 are the same as steps S8 to S10 and therefore will not be described further. The second controller 330 determines whether an operation signal indicating the end of the display is inputted from the remote control light receiver 310, and when the operation signal indicating the end of the display is not inputted (NO in step S16), the second controller 330 returns to the processing of step S13.

Details of step S7 will now be described with reference to the flowchart shown in FIG. 8.

First, the second controller 330 executes the first APP to generate the first APP image 615 (step S71) and arranges the generated first APP image 615 in the first screen 610 in the first display image 500A (step S72).

Next, the second controller 330 determines whether the captured image 635 transmitted from the projector 200 is received via the USB I/F 303 (step S73).

When the captured image 635 is not received via the USB I/F 303 (NO in step S73), the second controller 330 shifts to the determination of step S75.

When the captured image 635 is received via the USB I/F 303 (YES in step S73), the second controller 330 arranges the received captured image 635 in the second screen 630 in the first display image 500A (step S74).

Next, the second controller 330 determines whether operation information is received from the projector 200 via the USB I/F 303 (step S75).

When the operation information is not received (NO in step S75), the second controller 330 shifts to the determination of step S8.

When the operation information is received (YES in step S75), the second controller 330 generates the object image 550, based on the operation information (step S76). Next, the second controller 330 arranges the generated object image 550 at the position in the first display image 500A indicated by the operation information and thus generates the second display image 500B (step S77).

Details of step S13 will now be described with reference to the flowchart shown in FIG. 9.

First, the second controller 330 executes the first APP to generate the first APP image and executes the second APP, which is another APP than the first APP, to generate the second APP image (step S131).

Next, the second controller 330 arranges the first APP image in the first screen 610 in the first display image 500A and arranges the second APP image in the second screen 630 in the first display image 500A (step S132).

Next, the second controller 330 determines whether operation information is received from the projector 200 via the USB I/F 303 (step S133). When the operation information is not received (NO in step S133), the second controller 330 shifts to the determination of step S14.

When the operation information is received (YES in step S133), the second controller 330 generates the object image 550, based on the received operation information (step S134). Next, the second controller 330 arranges the generated object image 550 at the position in the first display image 500A indicated by the operation information and thus generates the second display image 500B (step S135).

Figure 10:
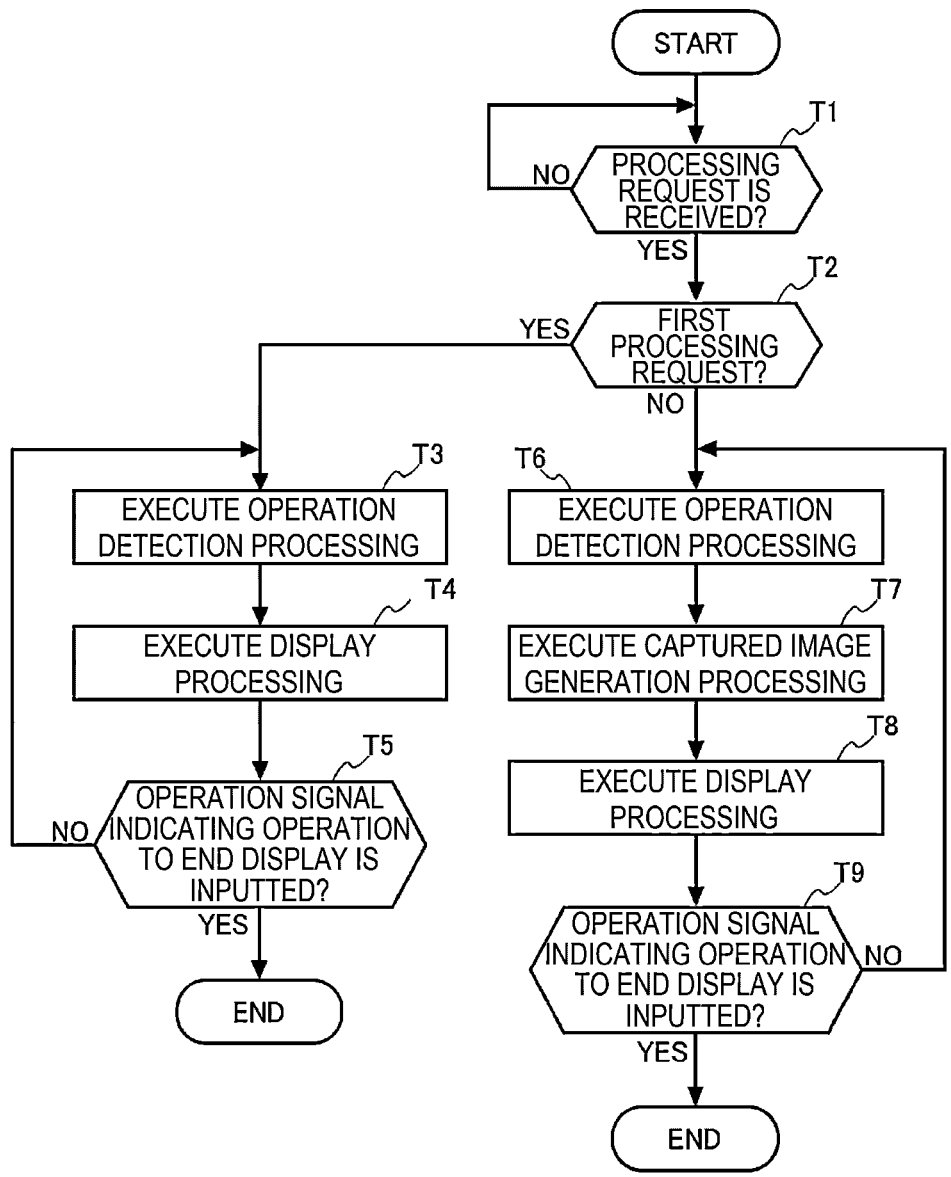
FIG. 10 is a flowchart showing operations of the projector.

FIG. 10 is a flowchart showing operations of the projector 200.

The operations of the projector 200 will now be described with reference to the flowchart shown in FIG. 10.

First, the first controller 270 determines whether a processing request is received from the control device 300 (step T1). When the processing request is not received (NO in step T1), the first controller 270 waits until the processing request is received.

When the processing request is received (YES in step T1), the first controller 270 determines whether the received processing request is the first processing request (step T2).

When the received processing request is the first processing request (YES in step T2), the first controller 270 detects the position indicated by the pointer 50 and generates operation information (step T3).

The first controller 270 analyzes the picked-up image inputted from the image pickup device 233 and detects the light emission of the second signal light 237 transmitted from the pointer 50. The first controller 270 analyzes a plurality of successive picked-up images and thus determines whether the detected light emission of the second signal light 237 is the light emission when the pointer 50 is in contact with the projection surface 30 or the light emission when the pointer 50 is not in contact with the projection surface 30. The first controller 270 converts the position of light emission of the second signal light 237 when the pointer 50 is in contact with the projection surface 30, to operation information indicating the indicated position on the projection surface 30, based on the calibration data. The first controller 270 transmit the generated operation information indicating the indicated position on the projection surface 30, to the control device 300.

Next, the first controller 270 causes the image based on the image data received from the control device 300 to be displayed on the projection surface 30 (step T4).

The first controller 270 receives the image data of the first display image 500A or the second display image 500B from the control device 300 and generates an image light based on the received image data. The first controller 270 causes the projection lens 255 to project the generated image light onto the projection surface 30. Thus, the first display image 500A or the second display image 500B is displayed on the projection surface 30.

Next, the first controller 270 determines whether an end notification to end the display of the display image is received from the control device 300 (step T5). When the end notification is not received (NO in step T5), the first controller 270 returns to the processing of step T3. When the end notification is received (YES in step T5), the first controller 270 ends this processing flow.

Meanwhile, when the received processing request is not the first processing request (NO in step T2), the first controller 270 determines that the received processing request is the second processing request.

In this case, too, as in step T3, the first controller 270 detects the position indicated by the pointer 50 and generates operation information (step T6) and the first controller 270 subsequently executes captured image generation processing (step T7).

In step T7, based on the identification information of the input I/F included in the second processing request, the first controller 270 captures the image based on the image data inputted to the input I/F indicated by this identification information and generates the captured image 635. The first controller 270 transmits the generated captured image 635 to the control device 300 via the first USB I/F 221.

Next, the first controller 270 causes the image based on the image data received from the control device 300 to be displayed on the projection surface 30 (step T8).

Next, the first controller 270 determines whether an end notification to end the display of the display image is received from the control device 300 (step T9). When the end notification is not received (NO in step T9), the first controller 270 returns to the processing of step T6. When the end notification is received (YES in step T9), the first controller 270 ends this processing flow.

5. Other Embodiments

The above embodiment is a preferred embodiment. However, the present disclosure is not limited to the above embodiment and can be carried out with various modifications without departing from the spirit and scope of the present disclosure.

For example, in the above embodiment, a case where the control device 300 transmits the image data of the first display image 500A or the second display image 500B to the projector 200 via the HDMI I/F 301 is described. Alternatively, the image data of the first display image 500A or the second display image 500B may be transmitted to a server device and distributed via a web by the server device.

Also, while a case where the projector 200 has the three transmission-type liquid crystal panels 253(R), 253(G), 253(B) as a light modulation device is described in the above embodiment, the present disclosure is not limited to this embodiment. For example, the projector 200 may have a reflection-type liquid crystal panel or a liquid crystal panel formed of a liquid crystal on silicon (LCOS). The projector 200 may also have one or more digital mirror devices (DMDs). With these configurations, the projector 200 has a light modulation device driver corresponding to the configuration of the light modulation device, instead of the panel driver 257. The present disclosure is also applicable to various projectors having the above various configurations as the light modulation device, and other display devices than the projectors.

Each functional element shown in each of FIGS. 1 and 2 represents a functional configuration and is not particularly limited to any specific form of installation. That is, pieces of hardware corresponding individually to the respective functional elements need not necessarily be installed, and as a matter of course, one processor may execute a program to implement functions of a plurality of functional elements. Also, a part of the functions implemented by software in the above embodiment may be implemented by hardware or a part of the functions implemented by hardware may be implemented by software. Moreover, the specific detailed configurations of the other parts of each of the projector 200 and the image pickup device 233 can be changed in any manner without departing from the spirit of the present disclosure.

When the control method for the display system, the control method for the display device, and the control method for the control device are implemented using a computer provided in the control device 300 and the projector 200, the program executed by the computer can be configured in the form of a recording medium or a transmission medium transmitting the program. As the recording medium, a magnetic or optical recording medium, or a semiconductor memory device can be used. Specifically, a portable recording medium such as a flexible disc, a hard disk drive (HDD), a CD-ROM, a DVD, a Blu-ray disc, a magneto-optical disc, a flash memory or a card-type recording medium, or a fixed recording medium may be employed. The above recording medium may also be a nonvolatile storage device such as a RAM, a ROM or an HDD that is an internal storage device provided in a server device. Blu-ray is a registered trademark.

6. SUMMARY OF PRESENT DISCLOSURE

A summary of the present disclosure will be given below in the form of appendices.

APPENDIX 1

A control method for a display system includes: causing a display device to acquire a first image; causing a control device to generate a first display image in which the first image acquired by the display image and a second image are arranged; causing the display device to display the first display image; causing the control device to perform processing on the first display image, based on operation information representing an operation to the first display image, and thus generate a second display image; and causing the display device to display the second display image.

With this configuration, the first display image in which the first image acquired by the display device and the second image are arranged is generated by the control device, and the generated first display image is displayed by the display device. Also, the second display image is generated by the control device, based on the operation information about the first display image, and the generated second display image is displayed by the display device.

Therefore, when the device supplying the first image to the display device cannot execute the processing based on the operation information, the control device generates the second display image based on the operation information about the first display image. The second display image is displayed by the display device. Thus, the processing on the first image and the second image can be executed, based on the operation information, and can be reflected on the first image.

APPENDIX 2

In the control method for the display system according to Appendix 1, the causing the control device to generate the first display image includes generating the first display image including the second image and not including the first image, when the display device cannot acquire the first image.

With this configuration, when the display device cannot acquire the first image, the first display image including the second image and not including the first image is generated. Therefore, the processing on the second image can be performed, based on the operation information about the first display image including only the second image.

APPENDIX 3

The control method for the display system according to Appendix 1 or 2 further includes: causing the display device to transmit the acquired first image to the control device via a first interface; and causing the control device to transmit the first display image and the second display image to the display device via a second interface that is different from the first interface.

With this configuration, the first image acquired by the display device, and the first display image and the second display image generated by the control device, are transmitted via different interfaces. Therefore, a delay in the display of the first display image and the second display image transmitted from the control device to the display device can be reduced.

APPENDIX 4

The control method for the display system according to one of Appendices 1 to 3 further includes: causing the display device to transmit the first image to the control device, and the causing the display device to transmit the first image to the control device includes: causing the display device to be recognized as a USB video class device by the control device when the display device and the control device are coupled together; and causing the display device to transmit the first image to the control device in a format prescribed by the USB video class.

With this configuration, the first image transmitted from the display device to the control device is transmitted in the format prescribed by the USB video class. Therefore, the control device need not perform processing such as converting the format of the first image, and the processing load of the control device can be reduced.

APPENDIX 5

The control method for the display system according to one of Appendices 1 to 4 further includes: causing the display device to acquire the operation information including a position of the first display image indicated by a pointer; and causing the display device to transmit the operation information to the control device, and the causing the control device to perform processing on the first display image and generate the second display image includes causing the control device to superimpose an object image based on the operation information onto the first display image and thus generate the second display image.

With this configuration, the processing on the first display image is performed, based on the operation information indicating the position indicated by the pointer, and the second display image is thus generated. Therefore, the object image can be displayed at the position indicated by the pointer.

APPENDIX 6

A control method for a display device includes: acquiring a first image and transmitting the acquired first image to a control device; receiving, from the control device, a first display image in which the first image and a second image are arranged; displaying the first display image; receiving, from the control device, a second display image generated by processing on the first display image, based on operation information representing an operation to the first display image; and displaying the second display image.

With this configuration, the first display image in which the first image acquired by the display device and the second image are arranged can be displayed by the display device. Also, the second display image generated by the processing based on the operation information about the first display image can be displayed by the display device. Thus, the second display image reflecting the processing on the first image and the second image, based on the operation information, can be displayed.

APPENDIX 7

A control method for a control device includes: generating a first display image in which a first image received from a display device and a second image are arranged; transmitting the first display image to the display device; processing the first display image, based on operation information representing an operation to the first display image, and thus generating a second display image; and transmitting the second display image to the display device.

With this configuration, since the first display image in which the first image acquired by the display device and the second image are arranged can be generated and the generated first display image is transmitted to the display device, the display device can display the first display image. Also, since the second display image can be generated based on the operation information about the first display image and the generated second display image is transmitted to the display device, the display device can display the second display image.

Therefore, when the device supplying the first image to the display device cannot execute the processing based on the operation information, the control device generates the second display image based on the operation information about the first display image. The second display image is displayed by the display device. Thus, the processing on the first image and the second image can be executed, based on the operation information.

What is claimed is:

1. A control method for a display system comprising:
   causing a display device to acquire a first image;
   causing a control device to generate a first display image in which the first image acquired by the display device and a second image are arranged;
   causing the display device to display the first display image;
   causing the control device to execute processing on the first display image, based on operation information representing an operation to the first display image, and thus generate a second display image; and
   causing the display device to display the second display image, wherein
   the causing the control device to generate the first display image includes
   generating the first display image including the second image and not including the first image, when the display device cannot acquire the first image.

2. The control method for the display system according to claim 1, further comprising:
   causing the display device to transmit the acquired first image to the control device via a first interface; and
   causing the control device to transmit the first display image and the second display image to the display device via a second interface that is different from the first interface.

3. The control method for the display system according to claim 1, further comprising:
   causing the display device to transmit the first image to the control device, wherein
   the causing the display device to transmit the first image to the control device includes:
   causing the display device to be recognized as a USB video class device by the control device when the display device is coupled to the control device; and
   causing the display device to transmit the first image to the control device in a format prescribed by the USB video class.

4. The control method for the display system according to claim 1, further comprising:
   causing the display device to acquire the operation information including a position of the first display image indicated by a pointer; and
   causing the display device to transmit the operation information to the control device, wherein the causing the control device to execute processing on the first display image and generate the second display image includes causing the control device to superimpose an object image based on the operation information onto the first display image and thus generate the second display image.

5. A control method for a display device comprising:

acquiring a first image and transmitting the acquired first image to a control device;

receiving, from the control device, a first display image in which the first image and a second image are arranged;

displaying the first display image;

receiving, from the control device, a second display image generated by executing processing on the first display image, based on operation information representing an operation to the first display image; and displaying the second display image, wherein the receiving, from the control device, the first display image includes generating the first display image including the second image and not including the first image, when the display device cannot acquire the first image.

6. A control method for a control device comprising:

generating a first display image in which a first image received from a display device and a second image are arranged;

transmitting the first display image to the display device;

executing processing on the first display image, based on operation information representing an operation to the first display image, and thus generating a second display image; and transmitting the second display image to the display device, wherein generating the first display image includes generating the first display image including the second image and not including the first image, when the display device cannot acquire the first image.

* * * * *